United States Patent [19]

Boeckner

[11] Patent Number: 5,375,021
[45] Date of Patent: Dec. 20, 1994

[54] BRACKET ASSEMBLY WHICH CREATES A PAIR OF LOOPS IN A FLEXIBLE CIRCUIT BOARD THAT COUPLES AN ACTUATOR ARM TO THE CONTROL CIRCUITS OF A HARD DISK DRIVE

[75] Inventor: James W. Boeckner, Broomfield, Colo.

[73] Assignee: Maxtor Corporation, San Jose, Calif.

[21] Appl. No.: 61,600

[22] Filed: May 13, 1993

[51] Int. Cl.$^5$ .......................... G11B 5/012; G11B 5/54
[52] U.S. Cl. ................................. 360/97.01; 360/105
[58] Field of Search ........... 360/97.02, 97.01, 104–109

[56] References Cited

U.S. PATENT DOCUMENTS

| | | | |
|---|---|---|---|
| 5,025,336 | 6/1991 | Morehouse et al. | 360/97.02 |
| 5,161,074 | 11/1992 | Forbord et al. | 360/97.01 |
| 5,223,993 | 6/1993 | Squires et al. | 360/106 X |
| 5,270,887 | 12/1993 | Edwards et al. | 360/97.01 X |

Primary Examiner—John H. Wolff
Attorney, Agent, or Firm—Blakely, Sokoloff, Taylor & Zafman

[57] ABSTRACT

A pair of brackets which can create a pair of loops in a flexible circuit board. The bracket includes a base portion and a wall which has a radius of curvature. At the intersection of the wall and base is a first slot. Opposite from the first slot is a second slot that is defined by a hook which extends from the top of the wall. The flexible circuit has a first edge which is initially inserted into the first slot and a second edge which is subsequently pushed past the hook into the second slot. The slots capture the flexible circuit board which extends along the radially shaped wall. The radial shaped wall bends the flexible circuit board so that the board has a first loop. The bracket is used to couple a first end of the flexible circuit board to the actuator arm of a hard disk drive. A second opposite end of the flexible circuit board is attached to a board bracket in such a manner to create a second loop in the flexible circuit board.

2 Claims, 2 Drawing Sheets

5,375,021

BRACKET ASSEMBLY WHICH CREATES A PAIR OF LOOPS IN A FLEXIBLE CIRCUIT BOARD THAT COUPLES AN ACTUATOR ARM TO THE CONTROL CIRCUITS OF A HARD DISK DRIVE

BACKGROUND OF THE INVENTION

1. Field of the Invention

The present invention relates to a bracket that is used to couple a flexible circuit board to the actuator arm of a hard disk drive.

2. Description of Related Art

Hard disk drives contain a magnetic head which can magnetize and sense the magnetic field of a magnetic disk. The magnetic head is located on the end of an actuator arm which can rotate the head relative to the surface of the disk. The head provides an analog signal to electronic devices that are mounted to the baseplate of the disk drive. The electronic devices are typically coupled to the actuator by a flexible circuit board. Flexible circuit boards contain conductive traces which are encapsulated by two layers of polyimide tape. The polyimide is flexible enough to be bent like a wire so that the board can be routed from the devices to the actuator arm.

When power to a disk drive is terminated, the head is typically moved to a landing zone located at the inner diameter of the disk. Many disk drives utilize the back EMF of the spin motor to generate power to move the heads to the landing zone of the disk. To assist in the movement of the heads to the landing zone, some actuator arm assemblies have a loop in the flexible circuit board which generates a spring force that biases the actuator arm toward the inner diameter of the disk. The loop is commonly formed by placing the flexible circuit within a notch that is machined into the actuator arm. The flexible circuit board is attached to the notch by screws, adhesives or other fastening means. Having to attach the flexible circuit to the actuator with screws or an adhesive increases the assembly time of the disk drive. It would be desirable to have an actuator arm assembly which will create a loop in the flexible circuit board and can be coupled to the arm without screws or an adhesive.

SUMMARY OF THE INVENTION

The present invention is a bracket which can create a radius of curvature in a flexible circuit board. The bracket includes a base portion and a wall which has a radius of curvature. At the intersection of the wall and base is a first slot. Opposite from the first slot is a second slot that is defined by a hook which extends from the top of the wall. The flexible circuit has a first edge which is initially inserted into the first slot and a second edge which is subsequently pushed past the hook into the second slot. The slots capture the flexible circuit board which extends along the radially shaped wall. The radial shaped wall bends the flexible circuit board so that the board has a radius of curvature. The bracket is typically used to couple the flexible circuit board to the actuator arm of a hard disk drive.

Therefore it is an object of the present invention to provide a bracket which can create a radius of curvature in a flexible circuit board.

It is also an object of the present invention to provide a bracket which can couple a flexible circuit board to an actuator arm without any fastening means.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
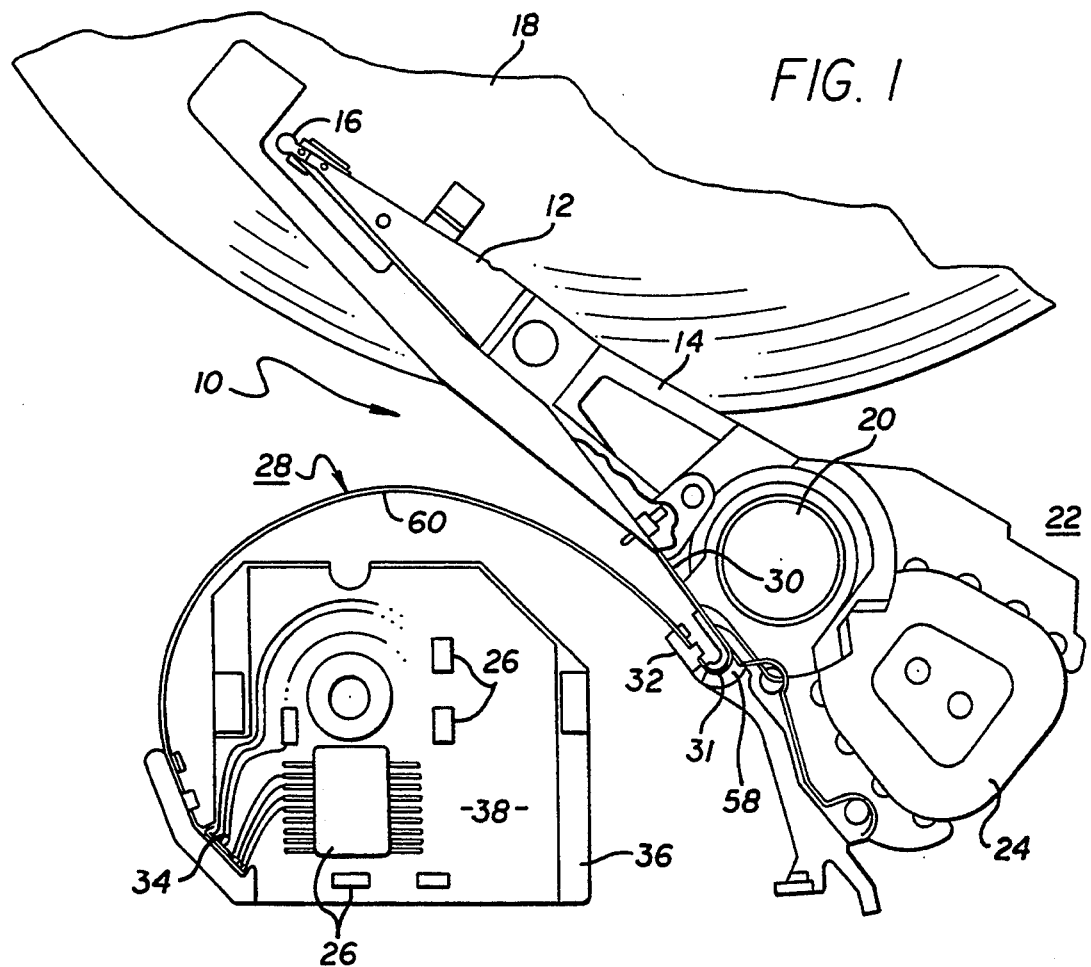
FIG. 1 is a top view of an actuator arm assembly of a hard disk drive.

Referring to the drawings more particularly by reference numbers, FIG. 1 shows an actuator arm assembly 10 of a hard disk drive. The actuator arm assembly 10 includes a flex beam 12 attached to an actuator arm 14. At the end of the flex beam 12 is a magnetic head 16 which can magnetize and sense the magnetic field of a magnetic disk 18. The magnetic head 16 pivots about a bearing assembly 20 that is coupled to the actuator arm 14. The bearing assembly 20 is mounted to a baseplate 22 of the disk drive. The actuator arm 14 also has a coil 24 which is coupled to magnet (not shown) that is attached to the base plate 22 of the drive. Energizing the coil 24 induces a rotation of the arm 14 and movement of the head 16 across the surface of the disk 18.

The magnetic head 16 provides an analog output signal which is processed by electrical devices 26 located within the disk drive. The head 16 is coupled to the devices 26 by a flexible circuit board 28. The flexible circuit board 28 is typically constructed from sheets of polyimide material that is sold by E. I. dupont deNemours under the trademark KAPTON. Between KAPTON are conductive leads that are etched into a predetermined pattern. The leads carry signals between the head 16 and the devices 26. KAPTON is a relatively flexible material which allows the circuit board 28 to be bent into a variety of configurations. As shown in FIG. 1, a first end 30 of the flexible circuit is bent 180° to form a loop 31.

In operation, the disk 18 is rotated by a spin motor (not shown), which induces a high pressure air gap between the head and the disk. The air gap separates the magnetic head 16 from the disk 18 so that the head does not scratch the surface of the disk. The spin motor discontinues rotation of the magnetic disk when power to the disk drive is terminated. Spinning down the disk will eventually eliminate the air gap and cause the head to land on the disk surface. To prevent contact between the head and the data portion of the disk, the disk drive will typically rotate the actuator arm to a landing zone located at the inner diameter of the disk. Power to move the actuator is typically created by the back EMF of the spin motor that is generated while the motor is spinning down.

The loop formed in the flexible circuit 28 creates a spring force that biases the actuator arm 14 toward the center of the disk 18. When power is terminated to the disk drive, the spring force of the flexible circuit 28 pushes the head 16 toward the landing zone of the disk 18. The actuator arm 14 has an actuator bracket 32 that captures and bends the flexible circuit 28 into the loop configuration. The actuator bracket 32 is typically integral with a piece part which also provides crash stop and latching features. The piece is typically mounted to the actuator arm 14 with an adhesive. The second opposite end 34 of the flexible circuit 28 is coupled to a board bracket 36. The second end 34 of the circuit may have a flat component portion 38 which supports some of the devices 26.

Figure 2:
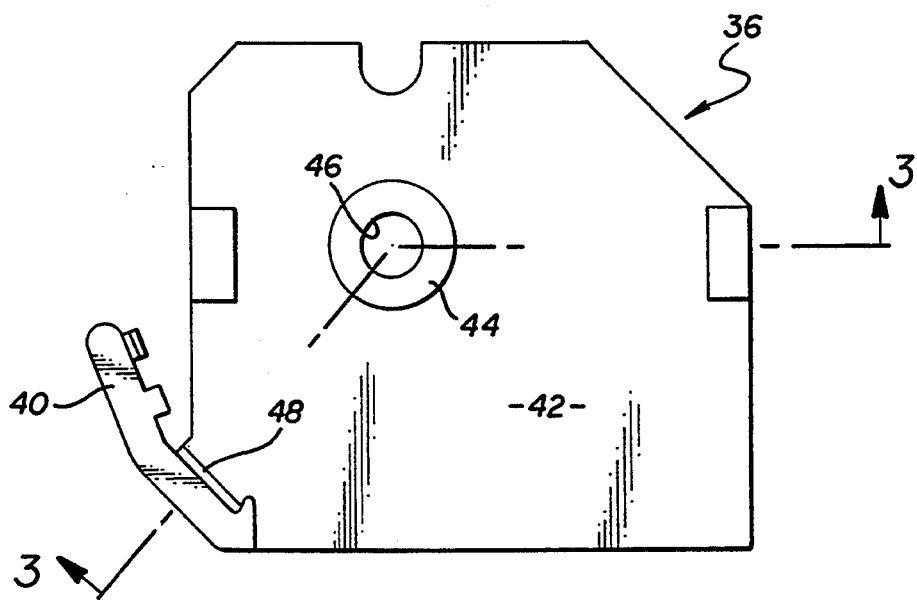
FIG. 2 is a top view of a board bracket of the actuator assembly.
Figure 3:
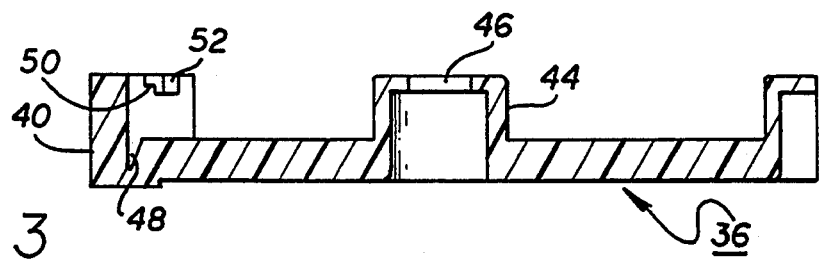
FIG. 3 is a cross-sectional side view of the board bracket of FIG. 2.
Figure 4:
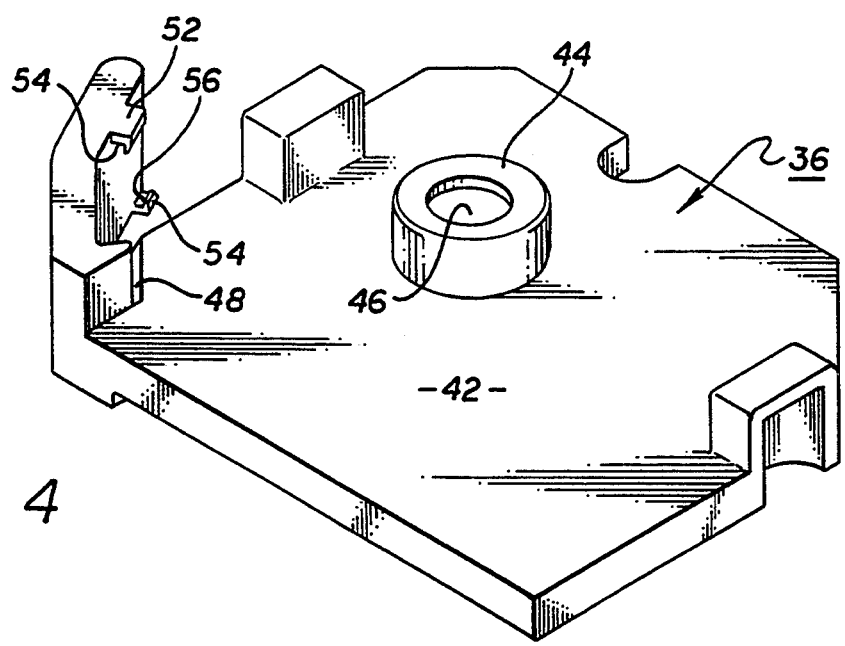
FIG. 4 is a perspective view of the board bracket.

As shown in FIGS. 2-4, the board bracket 36 has a wall 40 which extends from a base portion 42. The base 42 has a boss 44 which contains a clearance hole 46 that allows the bracket 36 and accompanying circuit board 28 to be mounted to the baseplate 22 of the drive. The bracket 36 has a first slot 48 located at the intersection of the base 42 and the wall 40. Opposite from the first slot 46 is a second slot 50. The second slot 48 is defined by a first hook 52 which extends from the top of the wall 38. The bracket 36 also has a second hook 52 which defines a lower slot 54 that is aligned with the first slot 48.

The actuator bracket 32 has a wall 58 which also contains a pair of slots (not shown) which capture the first end of the flexible circuit 28. The wall 58 of the actuator bracket 32 preferably has a radius of 180° to change the direction of the flexible circuit 28 and create a loop 60 in the circuit board 28. The loop 60 provides a spring force which biases the actuator arm 14 toward the center of the disk 18. The wall 38 of the board bracket 36 preferably has a bend which leads the flexible circuit board 28 into the bracket 36.

Figure 5A:
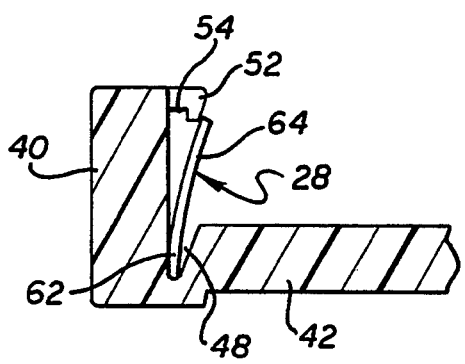
FIGS. 5a-b show a flexible circuit board being installed into the bracket.
Figure 5B:
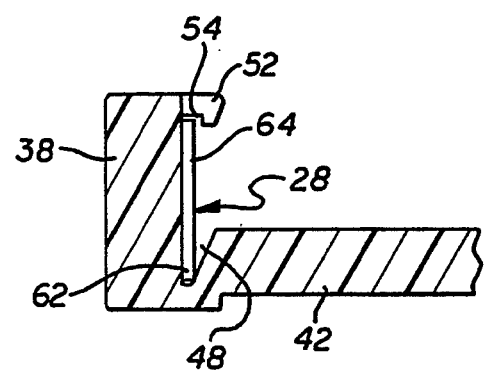

FIGS. 5a and 5b show the installation of the flexible circuit board 28 into the bracket 36. A first edge 62 of the flexible circuit is initially inserted into the first slot 46. A second opposite edge 64 of the flexible circuit is then pushed past the hook 52 and into the second slot 54. The ends of the flexible circuit are captured by the slots and extend along the walls of the brackets. The circuit is thereby bent into the loops and curves that correspond to the shapes of the bracket walls. The brackets of the present invention allow a flexible circuit to be assembled to an actuator arm assembly without any adhesives or fasteners as is required in the prior art. The lack of any fastening means reduces the assembly time of the actuator arm and the overall drive assembly.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a base plate;

a magnetic disk coupled to said base plate;

an actuator arm pivotally connected to said base plate;

an actuator bracket attached to said actuator arm and having a wall with a predetermined radius, said actuator bracket having a first slot and a second opposite slot that are adjacent to said wall;

a board bracket mounted to said base plate, said board bracket having a wall, a first slot and a second opposite slot adjacent to said wall;

a flexible circuit board that has a first end which is operatively connected to said actuator arm and that extends across said wall of said actuator bracket so that at least a portion of said flexible circuit board form a first loop, and a second end that is attached to said wall of said board bracket so that said flexible circuit board form a second loop, said flexible circuit board having a first edge located within and captured by said first slots of said actuator and board brackets and a second edge located within and captured by said second slots of said actuator and board brackets, wherein the second loop provides a spring force which biases the actuator arm towards the center of said disk.

2. The hard disk drive as recited in claim 1, wherein said radius of said actuator bracket wall is approximately 180°.

* * * * *